United States Patent [19]
Brandt

[11] Patent Number: 4,718,114
[45] Date of Patent: Jan. 5, 1988

[54] AC OVERLOAD PROTECTIVE CIRCUIT
[75] Inventor: Robert L. Brandt, Marion, Iowa
[73] Assignee: Rockwell International Corporation, El Segundo, Calif.
[21] Appl. No.: 845,162
[22] Filed: Mar. 27, 1986
[51] Int. Cl.$^4$ .............................................. H04B 1/16
[52] U.S. Cl. ..................... 455/217; 323/225; 323/226; 361/56; 361/111; 361/113; 455/283
[58] Field of Search ................ 361/54, 56, 59, 91, 361/111, 113; 323/225, 226; 455/217, 249, 250, 283

[56] References Cited
U.S. PATENT DOCUMENTS

| | | | |
|---|---|---|---|
| 3,052,853 | 9/1962 | Smith | 455/250 X |
| 3,372,336 | 3/1968 | Bachman et al. | 455/217 |
| 3,870,899 | 3/1975 | Stoffer | 455/217 X |
| 3,931,577 | 1/1976 | Barnett | 455/217 |
| 4,158,814 | 6/1979 | Imazeki et al. | 455/217 X |
| 4,355,414 | 10/1982 | Inoue | 455/250 X |

Primary Examiner—A. D. Pellinen
Assistant Examiner—A. Jonathon Wysocki
Attorney, Agent, or Firm—George A. Montanye; M. Lee Murrah; H. Fredrick Hamann

[57] ABSTRACT

An automatic AC protection circuit protects a radio receiver from RF overload by shortcircuiting the overload power to ground. The circuit includes a transistor having its collector coupled to the RF input and its emitter coupled to ground and the base coupled through an inductive impedance to ground. The value of inductive impedance in parallel with the base to emitter impedance of the transistor determines the RF input level at which the transistor turns on and clamps the RF to ground to protect a receiver from overload.

2 Claims, 2 Drawing Figures

AC OVERLOAD PROTECTIVE CIRCUIT

BACKGROUND OF THE INVENTION

The present invention relates to AC protective circuits, and more particularly to electronic circuits for protecting the input of a radio receiver from excessive AC voltages.

As is known in the art, various radio receivers are subject to damage upon the receipt of excessive levels of RF input unless appropriate steps are taken to protect the receiver input from voltages above a predetermined level. Such excessive voltages may occur when a receiver is in close proximity to transmitters or upon the inadvertent malfunction of devices which may couple RF power to a receiver. In any event, the occurrence of such excessive energy will damage the components of the RF receiver, thereby creating additional failures in the communications system.

In an effort to protect receivers from such excessive voltages, a variety of techniques have been employed. In one example, clamping of the RF input is employed to hold the input voltage level to below a predetermined value so that excessive voltages cannot be generated which would be harmful to the receiver. In other instances, the input voltage to the receiver is monitored for the purpose of switching the RF input from the receiver upon the occurrence of an excessive voltage condition. Each technique involves the use of fairly complex circuitry, or at a minimum requires the dissipation of significant power even before the overload condition occurs.

In one specific technique as exemplified by U.S. Pat. No. 3,988,640, there is shown a typical circuit for monitoring the input voltage and clamping the overload upon the occurrence of an overload condition. In the particular technique, however, there is a positive dissipation of power required to maintain the operation of the overvoltage protection circuit, even during the period of time an overload does not exist. Accordingly, although the problem of overload protection is addressed, it is accomplished with an accompanying continuous power loss of some sort. There is therefore a continuing need to provide improved overload protection with less cost, less complexity, and which can be easily implemented in a variety of electronic circuits.

The present invention has therefore been developed to overcome the specific shortcomings of the above known and similar techniques and to provide an improved AC protection circuit.

SUMMARY OF THE INVENTION

In accordance with one embodiment of the present invention, an overload protection circuit is disclosed which employs a single transistor coupled at the input to a radio receiver desired to be protected. The transistor is coupled so that its collector receives the RF input and its emitter is coupled to ground. Furthermore, an inductive impedance is coupled in series between the base of the transistor and ground. The value of the inductive impedance L is selected such that the inductive impedance in parallel with the base-to-emitter impedance determines the RF input level at which the transistor turns on to short or clamp the RF input to ground through the emitter. RF energy provided as input to the collector of the transistor is coupled through the collector-to-base capacitance to the inductive impedance in parallel with the emitter-to-base impedance to turn the transistor on when the RF input exceeds a predetermined value.

It is therefore a feature of the invention to provide an improved overload protection circuit.

It is a further feature of the invention to provide a less complex AC protection circuit which shorts an RF overload to ground.

It is a still further feature of the invention to provide an AC protection circuit which protects an RF receiver from overload but consumes no DC power until an overload occurs.

It is yet another feature of the invention to provide automatic reset of a protection circuit for allowing normal operation of a receiver when an overload is removed.

It is still a further feature of the invention to minimize loss at the desired frequency of operation of a receiver while employing an AC overload protection circuit.

Yet a further feature of the invention is to provide improved sensitivity in RF overload protection which may be implemented with inexpensive components yet provide improved operation and versatility.

These and other objects, advantages and novel features of the invention will become apparent from the following detailed description when considered in connection with the accompanying drawings in which:

DETAILED DESCRIPTION OF A PREFERRED EMBODIMENT

Figure 1:
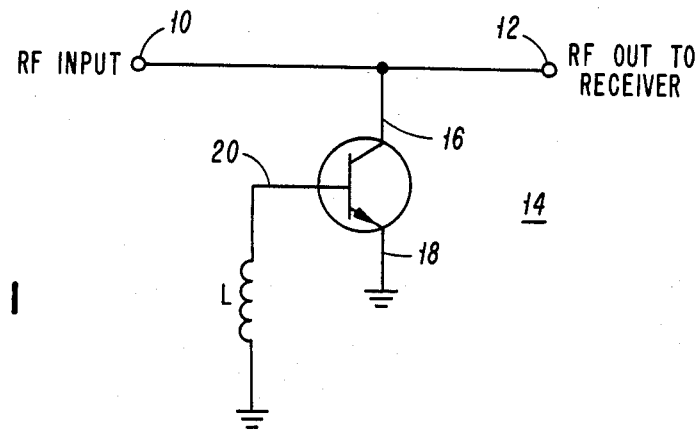
FIG. 1 is a schematic diagram showing a general embodiment of the protection circuit in accordance with the present invention.

Referring now to the Figures, there are shown schematic diagrams of the invention wherein like numerals are used to refer to like elements throughout. Specifically, as shown in FIG. 1, radio frequency (RF) input signals are provided to an input terminal 10 and are coupled to an RF output terminal 12 to supply a receiver or other electronic device having an overload protection circuit 14 for preventing excessive voltage at the output terminal 12. In accordance with the present invention, the protection circuit 14 generally includes a single transistor which includes a collector terminal 16, emitter terminal 18 and base terminal 20. The transistor 14 may be, for example, of conventional construction, so long as its characteristics accommodate the operation of the circuit 14 as described below.

In the generic circuit 14 shown, the collector 16 of the transistor is coupled to the conductive path between the input terminals 10 and 12 and the emitter 18 is coupled to a ground terminal which is shown as the current return path for convenience. It should be evident that other than ground potential may be the reference potential for the current return path in any particular application of the system. The base terminal 20 of the transistor is likewise coupled to one terminal of an inductor L which has its second terminal coupled to the current return path.

In accordance with the operation of the circuit 14 as shown, the transistor produces an impedance in the form of a capacitance to ground approximately equal to the collector to base capacitance which is viewed as a circuit loss at the desired operating frequency of the RF input to terminal 10. The capacitive impedance from the collector to base essentially couples the RF energy to the parallel connection of the inductive impedance L and the base to emitter impedance of the transistor. The selected value of the inductive impedance L determines the voltage input level of the RF input at terminal 10 at which the transistor turns ON and, depending upon the value of the base to emitter impedance, can be selected to provide a variable predetermined voltage level at which overload protection is provided depending upon the applications in which the circuit is used.

More particularly, when the RF energy at input 10 is coupled through the collector to base capacitance to the parallel coupling of the inductive impedance L and base to emitter capacitance of the transistor, the value of L will determine the RF level at which the base receives a voltage level sufficient to turn the transistor ON. At that point, the transistor will conduct between the collector terminal 16 and emitter terminal 18 to provide a DC current path between the two terminals and thereby short the input terminal 10 to ground. At this time, energy from the RF input 10 will be shunted to ground, thereby providing the overload protection by inhibiting excessive voltage output at terminal 12. Therefore, once the value of L is fixed, any predetermined value of RF input exceeding the value of RF output that causes the transistor to turn on at base 20, will protect any receiver or other electronic device from overvoltage conditions at terminal 12.

As an additional feature of the invention, once the overload condition at the RF input ceases, the bias of the base 20 holding the transistor in an ON condition will terminate, thereby resulting in the transistor turning off. At this time, the collector to emitter path shorting the RF input 10 will open and the RF input transmitted to the output 12 will again continue. The circuit therefore automatically resets in response to a decrease of the RF input to a value less than the overvoltage protection level without any unnecessary or more expensive control circuitry. The circuit 14 will continue to operate for all overload conditions with an automatic reset to continue operation when the overload ceases.

As will be appreciated, the operation of the circuit 14 is such that only a small amount of RF power is dissipated through the capacitive coupling from the collector to base during operation in a no-overload condition. At that time, there is no direct current path and no dissipation of power in maintaining the status of any switches or otherwise for monitoring the RF input and switching the RF input upon the detection of an overload condition. Accordingly, the circuit 14 provides improved efficiency in operation during a non-overload condition, yet responds immediately upon the detection of a predetermined RF input to provide a DC shunt for RF inputs exceeding that predetermined level. The operation occurs automatically and the circuit automatically resets upon the removal of the RF input level exceeding the predetermined overvoltage protection level.

Figure 2:
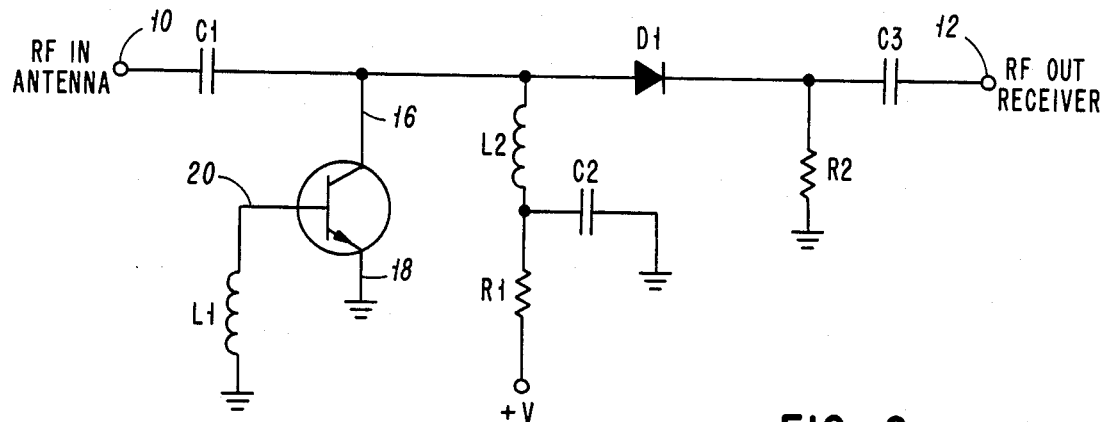
FIG. 2 is a more detailed schematic diagram showing a specific implementation of the invention in connection with the receipt of RF energy from an antenna.

Referring now to FIG. 2, there is shown a specific circuit for coupling RF energy from an antenna to a receiver which also utilizes the overvoltage protection circuit of the present invention. In this instance, RF input from an antenna is provided to the input terminal 10 and coupled through DC blocking capacitors C1 and C3 to the output terminal 12. A diode D1 is coupled in series between the capacitors C1 and C3 and in the present instance, is a PIN diode which is used to control the connection of the RF signals at input terminal 10 to the RF output terminal 12. The control of the PIN diode D1 is provided through the series connection of inductor L2 and resistor R2 to the voltage source +V. The resistor R2 is coupled to the anode of diode D1 to provide the current return to ground for the diode D1 when the capacitor C2 is coupled between ground and the interconnection between inductor L2 and resistor R2. As in FIG. 1, the transistor and associated elements which form the circuit 14 is arranged such that the collector 16 is coupled to the anode of the diode D1 and the emitter 18 is coupled to ground with an inductor L1 coupled in series between the base 20 and ground.

In operation, the voltage source V is used to couple a DC voltage to the anode of PIN diode D1 to cause D1 to conduct upon the application of a positive DC voltage, or cease to conduct upon the removal of that voltage. This control of the voltage with the source V is used to couple the antenna input at terminal 10 to the receiver at the output terminal. When the diode D1 is conducting, the RF input at terminal 10 is coupled through the capacitors C1 and C3 to the output terminal 12 and thence to the receiver or other electronic circuit. At that time, the protection circuit 14 operates in the manner described with respect to FIG. 1 to detect an overvoltage condition and provide a short between the collector and emitter 18 upon the detection of a predetermined voltage level determined by the inductor L1.

The circuit 14 provides overload protection and resets automatically upon the removal of overload condition. At the same time, the voltage V applied to the anode of the diode D1 is shorted through the same collector-to-emitter path when the transistor turns ON, and this short of the voltage through that path removes the positive voltage V to the diode D1 and thus turns off the PIN diode to further isolate the overload signal from the receiver input. Accordingly, the circuit acts in conjunction with a particular control to provide improved overload protection for a specific operating environment. This further illustrates the improved sensitivity and versatility of the inventive protection circuit.

As will be appeciated from the above description, the invention provides effective AC overload protection evidenced by extreme simplicity of operation and less expense than known devices of the prior art. The commercial acceptability of such a protection circuit is greatly improved by its versatility and applicability to a variety of electronic protection implementations and by its automatic operation. All of these features are accomplished without direct DC power dissipation until an overload condition is detected, thereby improving the efficiency of operation in any given application.

Obviously, many variations and modifications of the present invention are possible in light of the above teachings. It is therefore to be understood that within the scope of the appended claims, the invention may be practiced otherwise than as specifically described.

I claim:

1. An RF system comprising:
   an antenna providing a received RF signal as an input signal;
   a first capacitor having a first terminal coupled to receive said RF signal and a second terminal;
   a PIN diode having an anode terminal coupled to the second terminal of said first capacitor and a cathode terminal;

a second capacitor having a first terminal coupled to the cathode terminal of said diode and a second terminal;

a radio receiver coupled to said second terminal of said second capacitor for receiving RF signals;

a transistor having a collector coupled to the second terminal of said first capacitor, a base terminal, and an emitter terminal coupled to a current return path;

an inductor having a first terminal coupled to the base terminal of said transistor and a second terminal coupled to said current return path, said inductor having a value such that said transistor turns on in response to an RF input signal exceeding a predetermined value;

a second inductor having one terminal coupled to the anode of said diode and a second terminal;

a first resistor having a first terminal coupled to the second terminal of said second inductor and a second terminal coupled to receive a voltage;

a third capacitor having a first terminal coupled to the second terminal of said inductor and a second terminal coupled to said current return path;

a second resistor having a first terminal coupled to the cathode of said diode and a second terminal coupled to said current return path, said voltage source being selected to provide a DC voltage to bias the anode of said diode to conduct and to prevent said diode from conducting upon the removal of the voltage at said anode.

2. The system of claim 1 wherein said current return path is ground.

* * * * *